US007619651B2

(12) United States Patent
Suzuki

(10) Patent No.: US 7,619,651 B2
(45) Date of Patent: Nov. 17, 2009

(54) ELECTRONIC CAMERA HAVING FINISH SETTING FUNCTION AND PROCESSING PROGRAM FOR CUSTOMIZING THE FINISH SETTING FUNCTION

(75) Inventor: Masahiro Suzuki, Inzai (JP)

(73) Assignee: Nikon Corporation, Tokyo (JP)

( * ) Notice: Subject to any disclaimer, the term of this patent is extended or adjusted under 35 U.S.C. 154(b) by 686 days.

(21) Appl. No.: 11/039,966

(22) Filed: Jan. 24, 2005

(65) Prior Publication Data

US 2005/0162519 A1 Jul. 28, 2005

(30) Foreign Application Priority Data

Jan. 27, 2004 (JP) ............................. 2004-018295

(51) Int. Cl.
*H04N 5/225* (2006.01)
*H04N 5/235* (2006.01)
*H04N 5/222* (2006.01)
*H04N 5/76* (2006.01)

(52) U.S. Cl. ............. 348/207.1; 348/231.6; 348/333.02; 348/229.1

(58) Field of Classification Search ............... 348/207.1, 348/223.1, 229.1, 254, 231.6, 333.02, 362
See application file for complete search history.

(56) References Cited

U.S. PATENT DOCUMENTS

| 5,329,361 | A | 7/1994 | Matsui et al. | |
|---|---|---|---|---|
| 6,803,950 | B2 * | 10/2004 | Miyamoto et al. | ....... 348/207.1 |
| 6,972,789 | B1 * | 12/2005 | Aizawa | ................. 348/207.11 |
| 7,042,500 | B1 * | 5/2006 | Niikawa | ................... 348/211.4 |
| 7,268,808 | B2 * | 9/2007 | Kurokawa et al. | ....... 348/231.3 |
| 2001/0020978 | A1 | 9/2001 | Matsui et al. | |
| 2001/0052937 | A1 | 12/2001 | Suzuki | |
| 2004/0027456 | A1 * | 2/2004 | Pierce | ........................ 348/175 |

FOREIGN PATENT DOCUMENTS

EP    1 349 115 A2    10/2003
JP    A 7-030792    1/1995

(Continued)

OTHER PUBLICATIONS

"Canon EOS Digital Rebel 300D Instruction Manual, Printed in Taiwan, 2003".*

(Continued)

*Primary Examiner*—Nhan T Tran
(74) *Attorney, Agent, or Firm*—Oliff & Berridge, PLC

(57) ABSTRACT

An electronic camera of the present invention includes an image pickup part, an image quality control part, a storage part, an input part, and a control part. The image pickup part captures a subject image to generate image data. The image quality control part allows for performing multiple types of image processing in combination on the image data, thereby realizing multiple ways of finished image qualities. The storage part stores correlated information between finish keywords indicative of the finished image qualities and the "combinations of image processing operations" required for the finished image qualities. A finish keyword selected at the input part is referenced with the correlated information in the storage part to obtain a "combination of image processing operations". The image quality control part provides image quality control to the image data in accordance with the "combination of image processing operations" determined by the control part.

4 Claims, 10 Drawing Sheets

FOREIGN PATENT DOCUMENTS

| | | |
|---|---|---|
| JP | A 2001-057650 | 2/2001 |
| JP | 2001-352485 A | 12/2001 |
| JP | A-2002-232760 | 8/2002 |
| JP | A 2003-304484 | 10/2003 |

OTHER PUBLICATIONS

Anonymous, "Nikon 100 Compact and Lightweight, high-performance digital SLR camera," Nikon News Release, XP-002334392, pp. 1-7, Feb. 2002.

Anonymous, "The Nikon Guide to Digital Photography with the D100 Digital Camera," Nikon Corporation, XP-002334406, pp. 1-199, 2002.

Anonymous, "Nikon Capture 3, Users Manual," XP-00233407, pp. 1-245, 2002.

Anonymous., "Canon EOS Digital Rebel EOS 300D Digital Instruction Manual," Canon, Taiwan, XP002325135, 2003.

Anonymous, "The Nikon Guide to Digital Photography with the D100 Digital Camera," Nikon Corporation, XP-002334406, pp. 147, 2002.

* cited by examiner

「EXECUTION OF PROCESSING PROGRAM」

FIG. 4
MAIN MENU 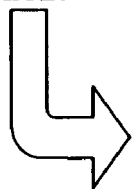
MENU WINDOW P FOR FINISH SETTING
FINISH SETTING
- NORMAL
- VIVID
- SHARPER
- SOFTER
- [PORTRAIT]  SELECT
- LANDSCAPE
- DIRECT PRINT
- CUSTOMIZE..
CUSTOMIZE
- [SETTING COMPLETED]  SELECT
- WHITE BALANCE
- WB FINE CONTROL
- EDGE ENHANCEMENT
- TONE SCALE CORRECTION
- COLOR MODE
- CHROMINANCE SETTING
MENU WINDOW Q FOR CUSTOMIZATION

FIG. 6

| | | Finish keyword | | | | | | |
|---|---|---|---|---|---|---|---|---|
| | | NORMAL | VIVID | SHARPER | SOFTER | DIRECT PRINT | PORTRAIT | LANDSCAPE | CUSTOMIZE |
| White balance | USER/AUTO SETTING | USER/AUTO SETTING | USER/AUTO SETTING | USER/AUTO SETTING | USER/AUTO SETTING | USER/AUTO SETTING | USER/AUTO SETTING | INDIVIDUALLY SETTABLE |
| WB fine control | USER/AUTO SETTING | USER/AUTO SETTING | USER/AUTO SETTING | USER/AUTO SETTING | USER/AUTO SETTING | USER/AUTO SETTING | USER/AUTO SETTING | INDIVIDUALLY SETTABLE |
| Edge enhancement (※1) | AUTO | AUTO | STRONG | RATHER WEAK | RATHER STRONG | RATHER WEAK | RATHER STRONG | INDIVIDUALLY SETTABLE |
| Tone scale correction (※2) | AUTO | AUTO | AUTO | AUTO | AUTO | AUTO FOR PORTRAIT | AUTO | INDIVIDUALLY SETTABLE |
| Color mode | MODE 1 | MODE 3 | MODE 1 | MODE 1 | MODE 1 | MODE 1 | MODE 3 | INDIVIDUALLY SETTABLE |
| Chrominance setting (※3) | AUTO | CLOSER TO HIGH CHROMINANCE | CLOSER TO HIGH CHROMINANCE | CLOSER TO LOW CHROMINANCE | CLOSER TO INTERMITTENT CHROMINANCE | OPTIMIZE SKIN COLOR CHROMINANCE | OPTIMIZE BLUE & GREEN CHROMINANCE | INDIVIDUALLY SETTABLE |

(※1) AUTO CONTROL RANGE SETTING FOR EDGE ENHANCEMENT (※2) AUTO CONTROL RANGE SETTING FOR TONE SCALE CORRECTION

ELECTRONIC CAMERA HAVING FINISH SETTING FUNCTION AND PROCESSING PROGRAM FOR CUSTOMIZING THE FINISH SETTING FUNCTION

CROSS-REFERENCE TO RELATED APPLICATION

The disclosure of the following priority application is herein incorporated by reference: Japanese Patent Application No. 2004-018295, filed Jan. 27, 2004.

BACKGROUND OF THE INVENTION

1. Field of the Invention

The present invention relates to an electronic camera which has a function of setting finished image quality of image data representative of a captured image (hereinafter referred to as the "finish setting function (OPTIMIZE IMAGE)"). The invention also relates to a (computer) processing program for customizing the finish setting function of the electronic camera.

2. Description of the Related Art

There have been available conventional electronic cameras which function to select scene modes such as a "landscape mode", a "portrait mode", and a "sport mode" (e.g., refer to claim 3 in Japanese Unexamined Patent Application Publication No. 2001-352485).

The electronic camera of this type requires the user to determine the type and circumstances of a subject and thereby select the scene mode. The electronic camera simultaneously changes the exposure setting of the camera system and the processing setting of the image processing system in response to the scene mode selected.

In general, a user who has used a film camera for a long time is familiar with the exposure operation of the camera. Accordingly, they may wish to reflect their individual experiences and sensitivities on the exposure of the camera to determine the exposure by themselves.

However, some of those users who have used the film camera for a long time are often unfamiliar with the control of image quality and thus wish to realize the desired finished image quality through a simple operation.

Conventionally, there have never been available such an electronic camera which satisfies these two requirements at the same time.

SUMMARY OF THE INVENTION

In view of the aforementioned problems, it is therefore an object of the present invention to provide an electronic camera which allows the user to go through a simple procedure to obtain the desired finished image quality.

It is another object of the invention to provide an electronic camera which enables user's own exposure operation while providing the desired finished image quality in a simple manner.

It is still another object of the invention to provide an electronic camera which provides consistency in the selection of exposure control and the selection of the finished image quality and thereby makes the electronic camera highly operative.

It is still another object of the invention to provide an electronic camera which allows the user to register the finished image quality by themselves.

It is another object of the invention to provide an electronic camera which can customize the finished image quality in a simple manner.

It is another object of the invention to provide an electronic camera which changes the once selected finished image quality at low processing costs.

It is another object of the invention to enable the use of an external computer to customize the finished image quality of the electronic camera.

Now, the present invention will be explained below.

[1] An electronic camera of the present invention includes an image pickup part, an image quality control part, a storage part, an input part, and a control part.

The image pickup part captures a subject image to generate image data.

The image quality control part performs multiple types of image processing in combination on the image data to thereby realize multiple ways of finished image qualities.

The storage part stores correlated information between finish keywords indicative of the finished image qualities and the "combinations of image processing operations" required for the finished image qualities.

The input part selects any of the finish keywords in response to a user input.

The control part references the correlated information stored in the storage part to determine the "combination of image processing operations" corresponding to the finish keyword selected at the input part.

The image quality control part provides image quality control to the image data in accordance with the "combination of image processing operations" determined by the control part.

For example, the aforementioned finish keywords preferably include "NORMAL", "VIVID", "SHARPER", "SOFTER", "DIRECT PRINT", "PORTRAIT", and "LANDSCAPE".

The user can imagine specifically the finished image qualities based on these finish keywords. Accordingly, the user can select a keyword which is close to their own intended photography depending on the finished image quality thus imagined.

For example, to take a picture of a vivid flower or the like, the user may select "VIVID" from the finish keywords to best meet the intended photography.

To enhance the vividness of an image, the user has to know the image processing for controlling the chrominance of image signals.

With conventional electronic cameras, it was inevitable for the user to know the chrominance control to obtain a vividly finished image.

However, according to the present invention, the knowledge on the image processing is provided not by the user but by the electronic camera (the storage part) instead. That is, the storage part has pre-stored correlated information between the finish keywords and the "combinations of image processing operations" required for finished image qualities.

Accordingly, the user is required only to provide a finish keyword to the electronic camera, thereby allowing the electronic camera to appropriately determine the "combination of image processing operations" required for the finished image quality desired by the user.

In this manner, the electronic camera can have such knowledge data (i.e., correlated information) on image quality control, thereby enabling even a user who is unfamiliar with image quality control to only select a finish keyword intuitively and thereby obtain the desired finished image quality in a simple manner.

[2] Preferably, the image pickup part has an exposure control mode for performing exposure control independent of the finish keyword.

In this case, the "exposure control selections" and the "finished image qualities" can be each combined, thereby realizing a variety of finished image qualities. As a result, it is possible to respond to the user's intended photography with a higher degree of flexibility.

Thus, especially for a user who wants to determine the exposure control by themselves but is unfamiliar with the image quality control, both the operations has been separated to thereby realize an electronic camera which is very easy to use for the user.

[3] The "exposure control mode independent of the finish keyword" preferably includes at least one of a programmed exposure mode, an aperture-priority auto exposure mode, a shutter-priority auto exposure mode, and a manual exposure mode. In this case, the input part receives the selecting operation of the finish keyword under a condition where an exposure control mode independent of the finish keyword is selected.

Such step-wise selections allow the user to first take into consideration the photographic effect of the exposure control mode and without hesitation, readily select a finish keyword which better makes use of the photographic effect (i.e., the finished quality of image quality control). That is, employing this step-wise operation realizes a rational and natural camera operation system which suits user's ways of thinking.

[4] It is more preferable that the storage part have a customizing function for receiving a user input to customize the correlated information.

Such a customizing function allows for registering a new finished image quality or individually changing part of the finished image quality.

As a result, this provides a greater degree of flexibility to the selection of finished image qualities, thereby allowing the user to construct their own cameras which provide their own way of controlling image qualities.

[5] Furthermore, it is also preferable that the electronic camera further include a manual control part and a favorite image selection part.

The manual control part allows the user to individually set or partly change the setting of the image processing, thereby providing a user's own image quality to image data.

The favorite image selection part allows a user to select the image data finished at the manual control part.

Furthermore, the storage part allows the "combination of image processing operations" applied to the image data selected at the favorite image selection part to be registered with the correlated information, thereby customizing the correlated information.

In such an arrangement, the user can select a favorite image, thereby allowing the "combination of image processing operations" applied to the favorite image to be registered with the storage part.

In this case, the user needs not to understand the detail of image quality control but can simply perform an intuitive operation or just select an image to thereby simply register a favorite finished image quality.

This favorite image is not limited to those whose image qualities have been controlled by the user themselves but may also include those which the user has selectively specified among third party public images (images made public on the Net).

[6] Furthermore, it is also preferable that the electronic camera of the present invention have the following function of changing a finished image quality.

First, the input part receives a change in finish keyword for image quality controlled image data.

On the other hand, the combination of image processing operations can be largely divided into "nonlinear tone scale correction processing", "pre-processing to be performed before the tone scale correction processing", and "post-processing to be performed after the tone scale correction processing".

In this arrangement, the image quality control part performs the following processing operations (1) to (5) on the image quality controlled image data for which a change in finish keyword has been accepted.

(1) The image quality control part performs an inverse conversion on the result from the post-processing that has been performed. This procedure allows for generally recovering image data that has been provided immediately after the tone scale correction processing.

(2) The image quality control part then performs an inverse conversion on the result from the tone scale correction processing that has been performed. This procedure allows for generally recovering the image data immediately before the tone scale correction.

(3) The image quality control part then performs processing on the difference between the "performed pre-processing" and the "pre-processing corresponding to the changed finish keyword". This differential processing makes it possible to immediately obtain the image data on which the "pre-processing corresponding to the changed finish keyword" has been performed.

(4) The image quality control part then performs the "tone scale correction processing corresponding to the changed finish keyword". As a result, it is possible to obtain the tone scale corrected image data corresponding to the "changed finish keyword".

(5) The image quality control part then performs the "post-processing corresponding to the changed finish keyword". As a result, obtained is the image quality controlled image data by the "changed finish keyword".

A series of these processing operations allow for making an ex post facto change the finished image quality. In particular, the aforementioned differential processing has been successfully employed to reduce the processing man-hour for the pre-processing. As a result, it is possible to save power consumption and achieve higher-speed processing at lower costs for the pre-processing.

[7] Preferably, a computer may be employed to customize the correlated information in the electronic camera. In this case, the computer executes a processing program so as to function as the following manual control part, the favorite image selection part, and an information transmission part.

First, the manual control part receives a user input to set image processing operations one by one or partially change the settings thereof based on default controls. The user employs the function of the computer to finish the image data to their own image quality on the computer.

The favorite image selection part allows a user input to select the image data finished at the manual control part.

The information transmission part transmits the information on the "combination of image processing operations" applied to the image data selected at the favorite image selection part to the electronic camera as the customized data on the correlated information.

Such processing using a computer makes it possible to customize the correlated information on the electronic camera side. In particular, the high-level operational environments of a computer can be brought into full play to make detailed controls to image quality, thereby customizing the finished image quality in an exacting manner.

BRIEF DESCRIPTION OF THE DRAWINGS

Other and further objects, features and advantages of the invention will appear more fully from the following description.

FIG. 4 is a view showing a menu displayed on the electronic camera 11;

FIG. 6 is a view showing an example of correlated information;

DESCRIPTION OF THE PREFERRED EMBODIMENT

Now, the present invention will be explained below in more detail with reference to the accompanying drawings in accordance with the embodiment.

[Explanation of the Arrangement of this Embodiment]

Figure 1:
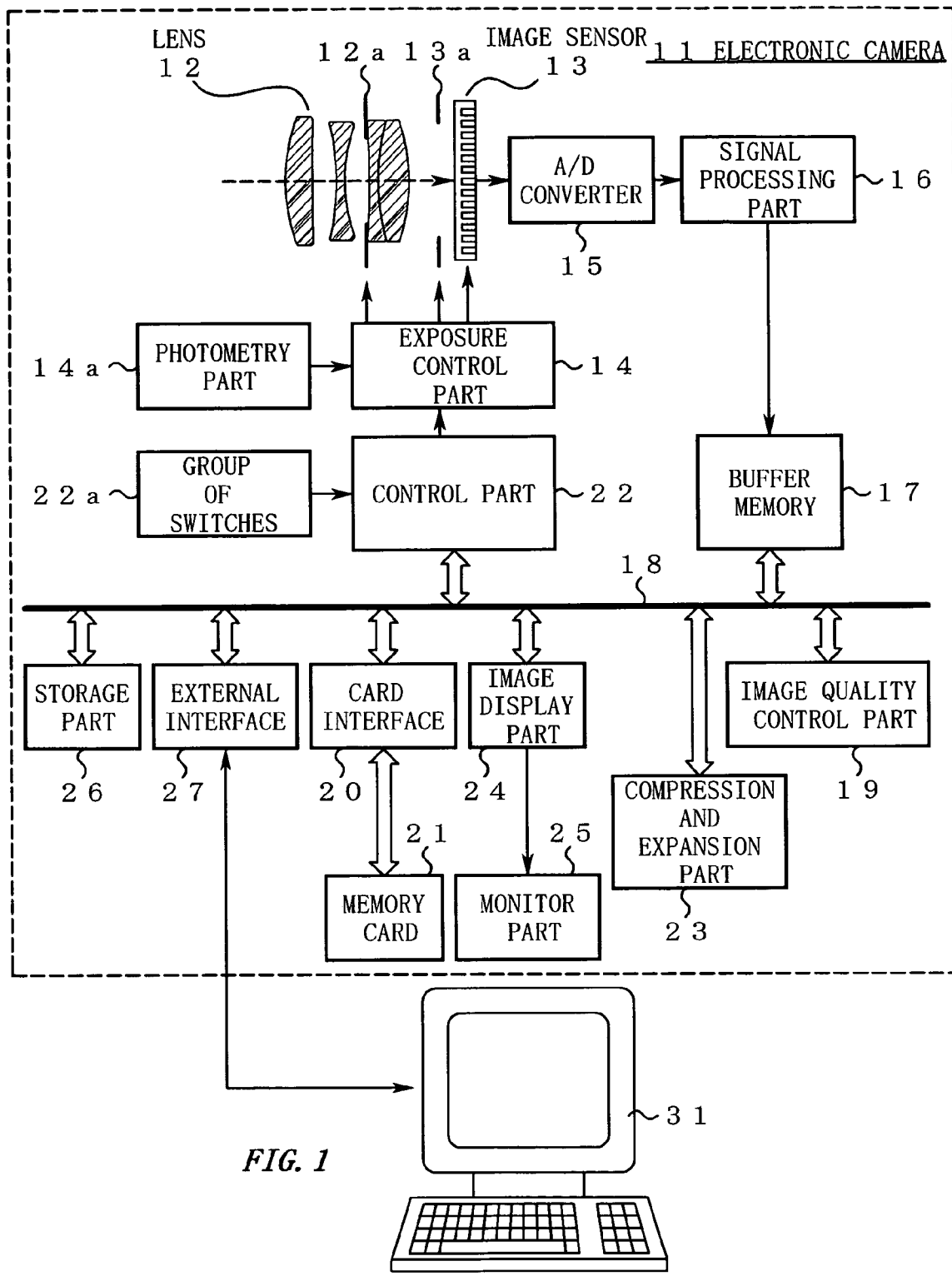
FIG. 1 is a block diagram showing the configuration of an electronic camera 11.

FIG. 1 is a block diagram showing the configuration of an electronic camera 11.

Figure 2:
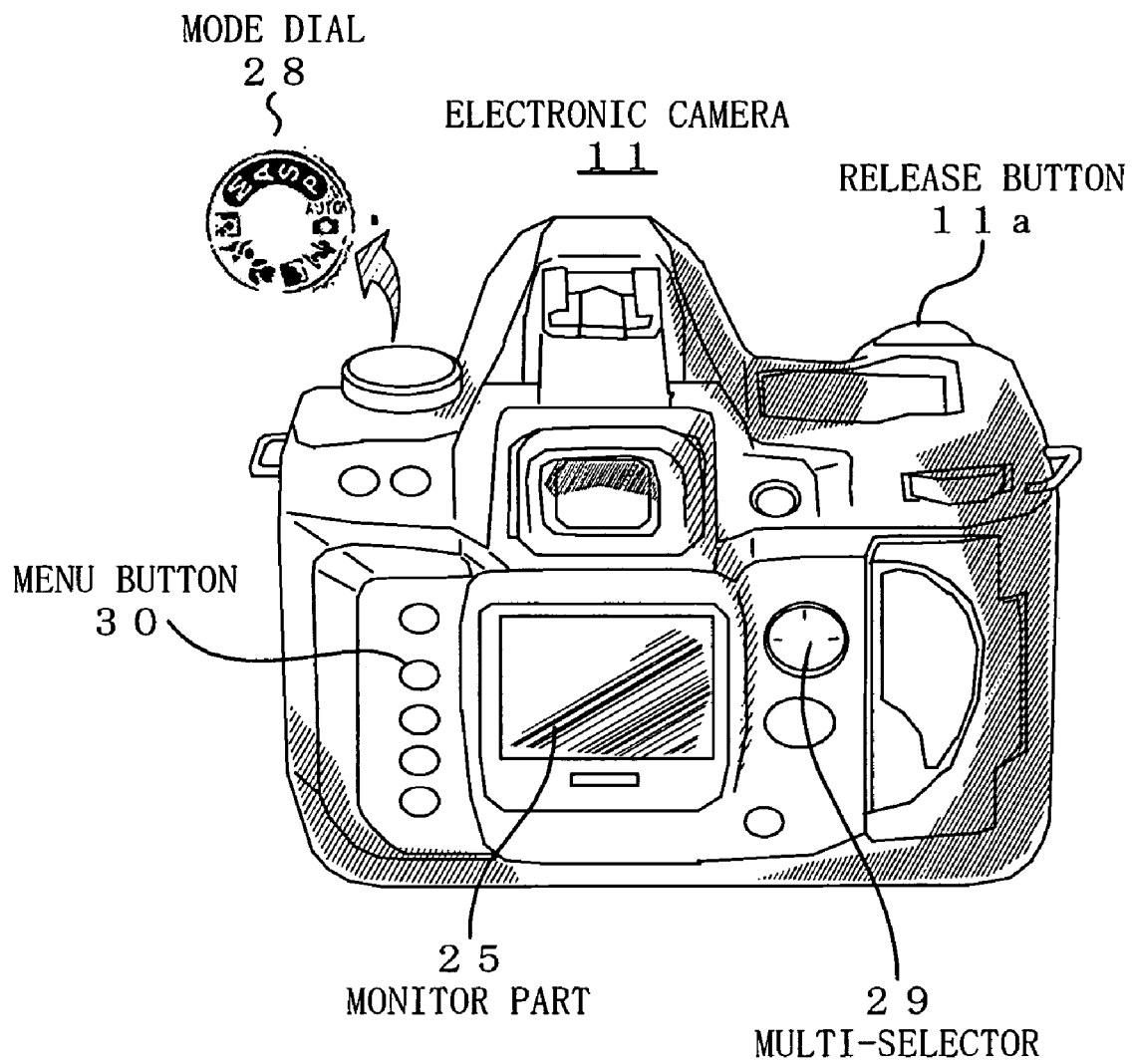
FIG. 2 is an external view showing the layout of a group of switches 22a on the electronic camera 11.

FIG. 2 is an external view showing the layout of a group of switches 22a on the electronic camera 11.

In these figures, the electronic camera 11 is detachably provided with a lens 12.

The lens 12 includes a diaphragm 12a. On the image plane of the lens 12, provided are a shutter 13a and an image sensor 13. The diaphragm 12a, the shutter 13a, and the image sensor 13 are driven by an exposure control part 14. The exposure control part 14 is supplied with TTL multi-photometry information from a photometry part 14a provided in a finder optical system (not shown).

Image data generated in the aforementioned image sensor 13 is processed through an analog-to-digital converter 15 and a signal processing part 16, and then temporarily stored in a buffer memory 17.

The buffer memory 17 is connected to a bus 18. The bus 18 is connected with an image quality control part 19, a card interface 20, a control part 22, a compression and expansion part 23, an image display part 24, a storage part 26, and an external interface 27.

Of them, the card interface 20 is provided with a detachable memory card 21. The control part 22 is connected with a group of switches 0.22a of the electronic camera 11. As the group of switches 22a, the electronic camera 11 is provided with a mode dial 28, a multi-selector 29, a menu button 30, and a release button 11a.

Furthermore, the image display part 24 displays images on a monitor part 25 provided on the back of the electronic camera 11.

Additionally, the storage part 26 has the pre-stored correlated information shown in FIG. 6.

Furthermore, the external interface 27 can communicate information with an external computer 31 through a cable, by radio waves, or using optical communications.

[Correspondence between the Components in the Embodiment and the Claims of the Present Invention]

Now, the correspondence between the components in the embodiment and the claims of the present invention will be explained below. The following correspondence is shown only as an example for reference and thus should not be construed as limiting the scope of the present invention.

The image pickup part set forth in the claims corresponds to the image sensor 13, the shutter 13a, and the analog-to-digital converter 15.

The image quality control part set forth in the claims corresponds to the image quality control part 19.

The storage part set forth in the claims corresponds to the storage part 26.

The input part set forth in the claims corresponds to the group of switches 22a.

The control part set forth in the claims corresponds to the control part 22.

The computer set forth in the claims corresponds to the computer 31.

[Shooting Operation of the Electronic Camera 11]

Figure 3:
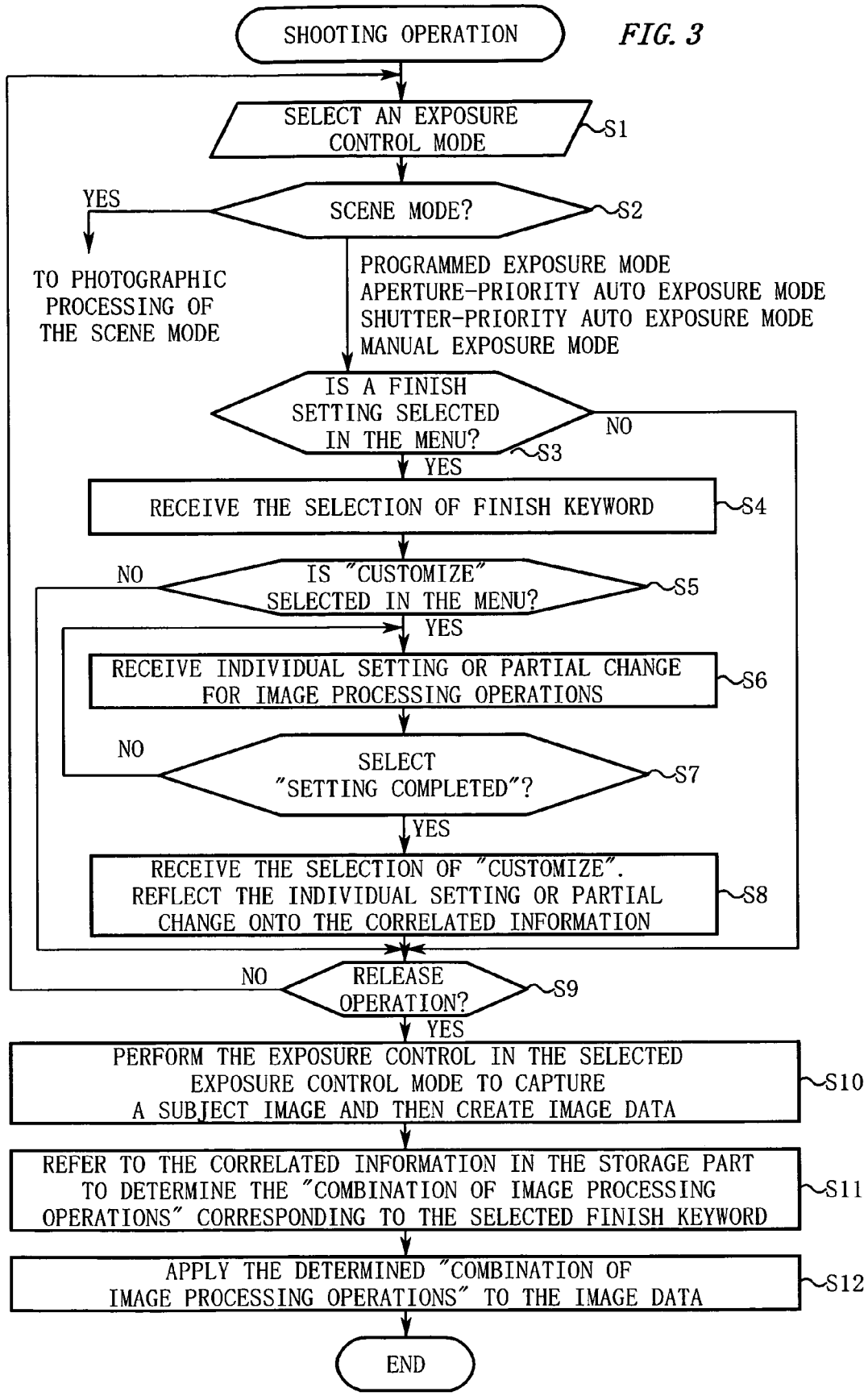
FIG. 3 is an explanatory flowchart showing the steps of operating the electronic camera 11 to take a picture.

FIG. 3 is an explanatory flowchart showing the shooting operation of the electronic camera 11. Now, the shooting operation will be explained following the step numbers shown in FIG. 3.

[Step S1] The user can operate the mode dial 28 (see FIG. 2) to change the operational mode of the camera at any time. In this case, the operational mode is largely divided into a scene mode illustrated on the surface of the dial and an exposure control mode indicated by a symbol "PSAM" or the like.

The scene mode is typical of a portrait mode. In the scene mode, the exposure control and image quality control are determined together. For this reason, the scene mode does not allow independent selections of the exposure control and the image quality control. (However, during the scene mode being selected, the finish setting function may be activated to change the image quality control of the scene mode as appropriate).

On the other hand, the exposure control mode is an operational mode which relates only to exposure control and thus can be set independently of image quality control. The electronic camera 11 is provided with the following modes as such an exposure control mode:

Programmed exposure mode (P): An exposure control mode for the camera side to automatically determine the combination of a shutter speed and an aperture value according to a program flowchart or the like.

Aperture-priority auto exposure mode (A): An exposure control mode for automatically determining the shutter speed according to the aperture setting by the user.

Shutter-priority auto exposure mode (S): An exposure control mode for automatically determining the aperture value according to the shutter speed setting by the user.

Manual exposure mode (M): An exposure control mode for the user to manually set a shutter speed and an aperture value.

[Step S2] The control part 22 acquires contact information of the mode dial 28 to determine whether the scene mode has been selected.

If the scene mode has been selected, the control part 22 moves its control to the photographic processing of the scene mode. This scene mode is well known and thus its operation will not be explained.

On the other hand, if the aforementioned four types (P, A, S, and M) of exposure control modes are selected, the control part 22 moves its control to step S3.

[Step S3] In these four types (P, A, S, and M) of exposure control modes, it is possible to use a function of setting the finished image quality of an image (hereinafter referred to as the "finish setting").

To make this finish setting, the user depresses the menu button 30 to display a main menu on the monitor part 25, and then selects a menu entry "FINISH SETTING" in the main menu.

When the menu entry "FINISH SETTING" has been selected, the control part 22 moves its control to step S4.

On the other hand, if the menu entry "FINISH SETTING" has not been selected, the control part 22 moves its control to step S9 while the current finish setting (i.e., the result of selection of the previous finish keyword) is being maintained.

[Step S4] In response to the selection of the menu entry "FINISH SETTING", the control part 22 changes the display on the monitor part 25 from the main menu to a menu window P (see FIG. 4) for finish setting.

This menu window P displays a plurality of finish keywords (such as "VIVID", "PORTRAIT", and "CUSTOMIZE").

The user may manipulate the up and down keys to move the focus (an indication showing an entry selection) among these finish keyword entries, then manipulating the right key to select and decide the finish keyword at the position of the focus.

[Step S5] After the finish keyword has been selected in this manner, the control part 22 moves its control to Step S9.

If the finish keyword "CUSTOMIZE" has been selected, the control part 22 moves its control to Step S6.

[Step S6] The control part 22 changes the display on the monitor part 25 to a menu window Q (see FIG. 4) for customizing operations according to the decisive selection of the "CUSTOMIZE".

The menu window Q displays a menu entry "SETTING COMPLETED" at the top. Below this menu entry, other image processing entries are arranged which can be individually set in the "CUSTOMIZE".

Figure 5:
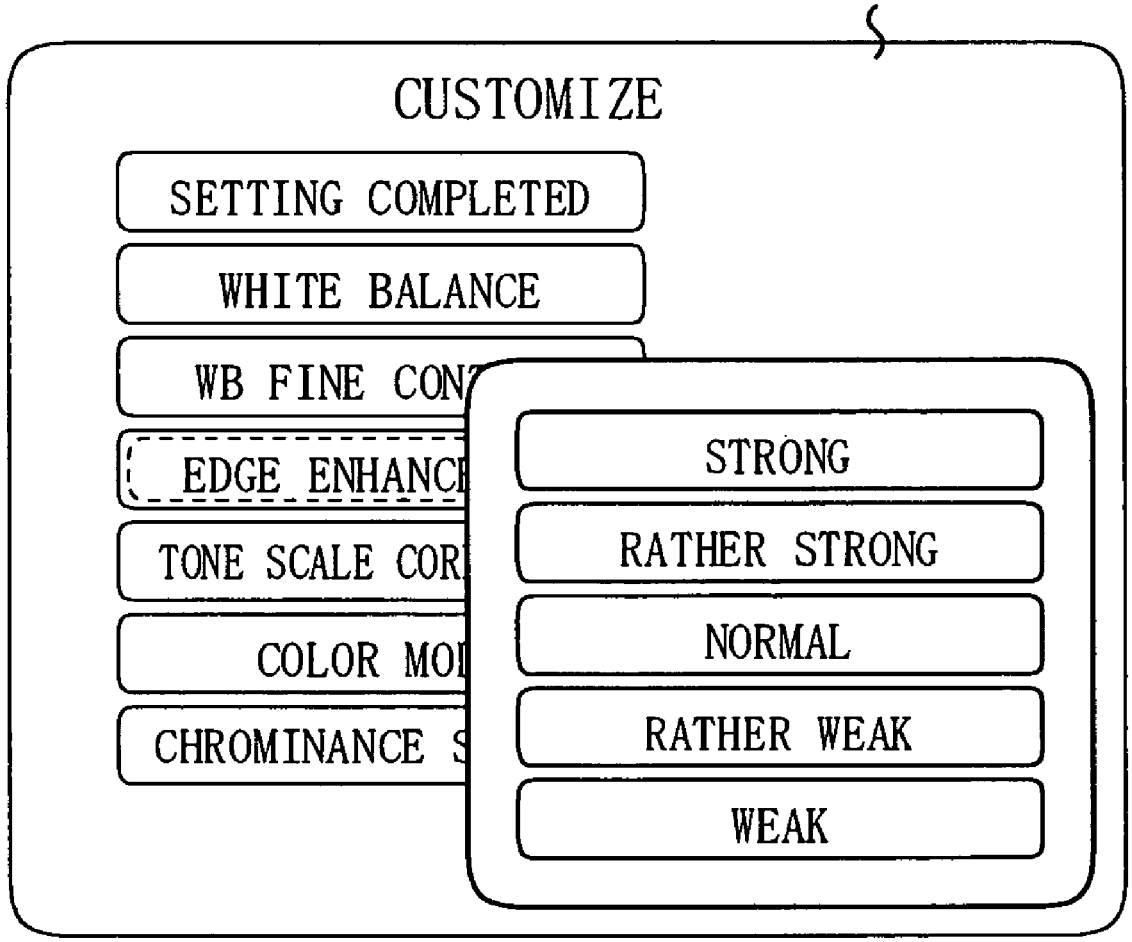
FIG. 5 is a view showing a menu displayed on the electronic camera 11.

As shown in FIG. 5, when the user moves the focus among these image processing entries, the specific parameters (such as strong or weak) for the image processing entries appear in a pop-up menu. The user can select the parameter of a desired image processing entry, thereby set the combination of image processing operations in the "CUSTOMIZE".

[Step S7] Such changes in the "CUSTOMIZE" can be made repeatedly until the user interruptively cancels the menu operation (by depressing the left key of the multi-selector 29 or the menu button 30), or until the user selects the "SETTING COMPLETED" in the menu.

If the operation is interruptively canceled, the control part 22 clears the customized contents, and moves its control to the previous menu window.

On the other hand, if the "SETTING COMPLETED" has been selected in the menu, the control part 22 moves its control to Step S9.

[Step S8] The setting completed allows the current finish keyword to be selected and decided in the "CUSTOMIZE".

If individual settings or partial changes have been made in Step S6, the control part 22 operates to rewrite the correlated information in the storage part 26 (the data in the "CUSTOMIZE" column shown in FIG. 6) so as to reflect such changes.

[Step S9] In this step, the control part 22 checks for the release button 11*a* having been depressed.

If the release button 11*a* has been depressed, the control part 22 moves its control to Step S10.

On the other hand, if the release button 11*a* has not been depressed, the control part 22 returns its control to Step S1 to successively receive changes in mode before shooting.

[Step S10] The control part 22 instructs the exposure control part 14 to provide exposure control corresponding to the currently selected exposure control mode in response to the release operation.

The exposure control part 14 acquires TTL multi-photometry information from the photometry part 14*a* to determine the exposure following the operational sequence of the exposure control mode. The exposure control part 14 follows the determination of the exposure to provide exposure control to the diaphragm 12*a*, the shutter 13*a*, and the image sensor 13.

This exposure control causes the image data generated in the image sensor 13 to be processed through the analog-to-digital converter 15 and the signal processing part 16, and then stored in the buffer memory 17.

[Step S11] The control part 22 references the correlated information (FIG. 6) in the storage part 26 to determine column data corresponding to the currently selected finish keyword (i.e., the combination of image processing operations).

[Step S12] The "combination of image processing operations" thus determined is transferred from the control part 22 to the image quality control part 19. The image quality control part 19 then performs image processing sequentially on the image data in the buffer memory 17 in accordance with the "combination of image processing operations" thus transferred.

The image data that has been generated in this manner through the exposure control and the image quality control intended by the user is compressed in the compression and expansion part 23 as required into an image file. The control part 22 adds the information on the finish keyword or the "combination of image processing operations" to the image file, and then writes the information on the memory card 21 via the card interface 20 for storage.

[Example of Correlated Information]

FIGS. 6 to 9 illustrate an example of preferred correlated information. Now, referring to these figures, the "combination of image processing operations" that is set for each finish keyword will be explained in accordance with a specific example.

(1) "NORMAL"

The "NORMAL" is a finish keyword that is selected as a default in the P, S, A, and M exposure control modes.

First, the white balance control and white balance fine control settings are determined through automatic setting or user setting (such as optical source setting or pre-set white balance).

Figure 7:
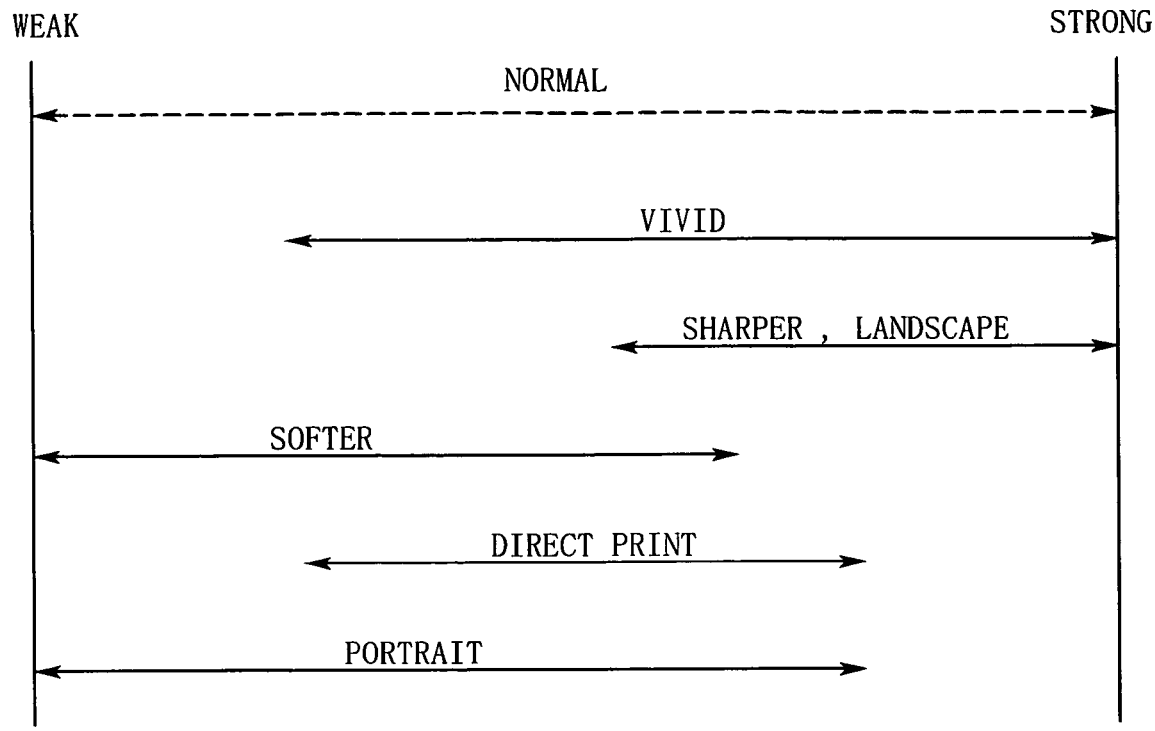
FIG. 7 is a view showing an exemplary setting for edge enhancement.

Furthermore, for the edge enhancement, the amount of high frequency components is determined from the spatial differential of image data to automatically control the level of edge enhancement in accordance with the shortage of the high frequency components with respect to a target value. As shown in FIG. 7, in the "NORMAL", the target value of this automatic control is set to an intermediate normal value, and the upper and lower limits of the edge enhancement is set as wide as possible. Such a setting allows for providing a normal edge enhancement that is preferred by a majority of image data.

Figure 8:
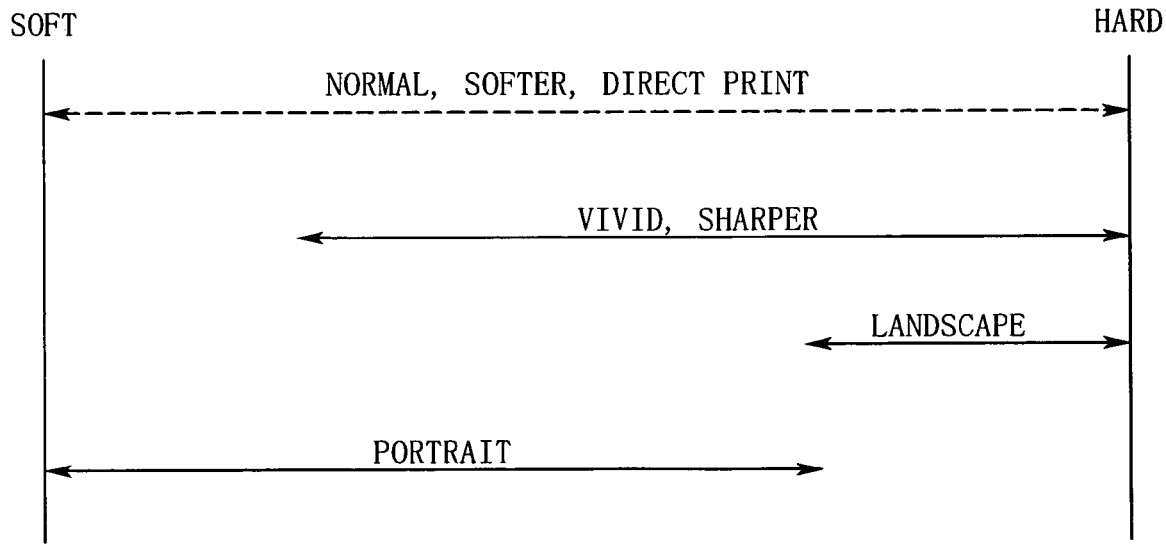
FIG. 8 is a view showing an exemplary setting for tone scale correction.

On the other hand, for the tone scale correction, the amount of contrast and its incidence are determined from the bright and dark level of image data, and the tone scale correction curve is automatically controlled according to the difference between the contrast tendency and the target value. As shown in FIG. 8, the "NORMAL" allows for setting the automatically controlled target value to an intermediate normal value as well as the alternatives for tone scale correction curves to the widest possible range. Such a setting allows for making a normal tone scale correction that is preferred by a majority of image data.

On the other hand, in the color mode, mode 1 is selected. The mode 1 is a color mode which is suitable for sRGB color space. In particular, the mode 1 optimizes the color reproducibility of red-based colors (skin color), thereby providing an excellent reproducibility of color mainly for portraits.

Figure 9:
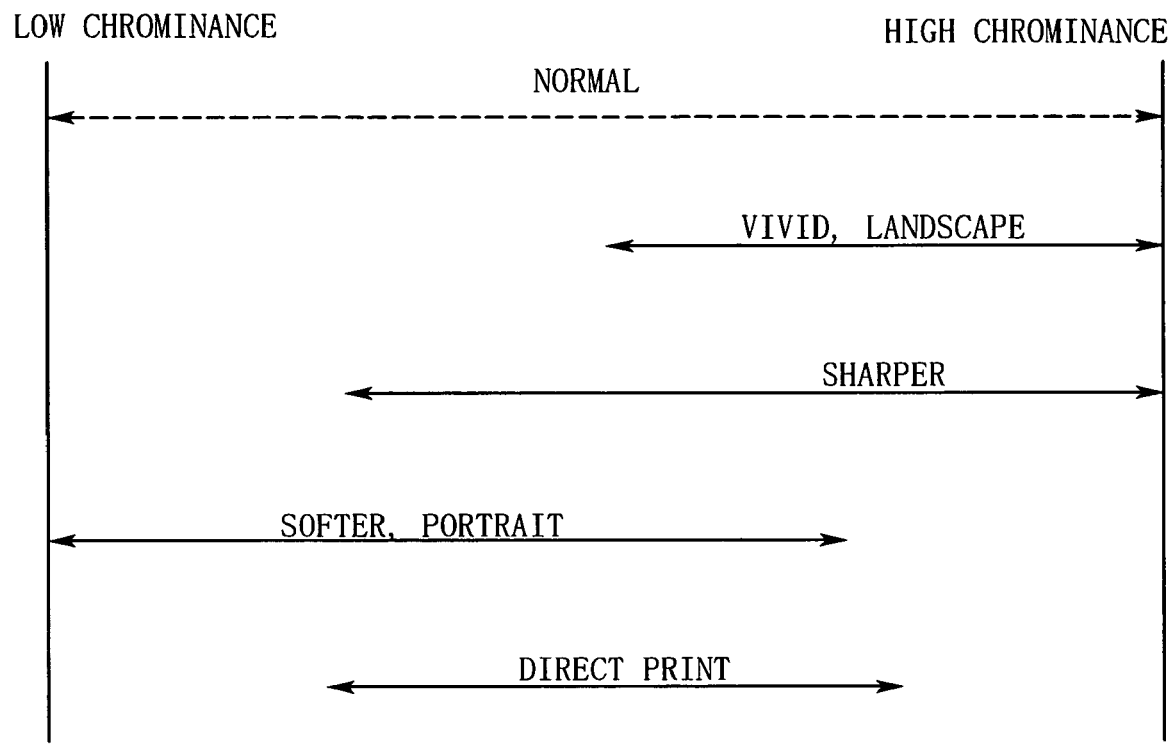
FIG. 9 is a view showing an exemplary setting for chrominance.

On the other hand, for the chrominance setting, the chrominance level of image data and its incidence are determined, and then the chrominance control level is automatically adjusted according to the difference between the chrominance tendency and the target value. As shown in FIG. 9, the "NORMAL" allows for setting the automatically controlled target value to an intermediate normal value as well as the chrominance control to the widest possible range. Such a setting allows for providing normal chrominance control that is preferred by a majority of image data.

(2) "VIVID"

The "VIVID" allows the edge enhancement to be automatically controlled. However, as shown in FIG. 7, the "VIVID" allows the automatically controlled target value to be set to a slightly stronger value than the normal value and the edge enhancement to be set to a somewhat narrow range. Such a setting allows for performing a slightly stronger edge enhancement to further amplify vivid color image data.

On the other hand, the tone scale correction is also automatically controlled.

However, as shown in FIG. 8, the "VIVID" allows the automatically controlled target value to be set to a slightly harder contrast value than the normal value and particularly only soft curves to be excluded from tone scale correction alternatives. Such a setting allows for performing a slightly contrast enhanced tone scale correction to further amplify vivid color image data.

On the other hand, in the color mode, mode 3 is selected. The mode 3 is a color mode which is suitable for sRGB color space. In particular, the mode 3 optimizes the color reproducibility of green- and blue-based colors, thereby providing an excellent reproducibility of color mainly for landscapes.

On the other hand, the chrominance setting is also automatically controlled.

However, as shown in FIG. 9, the "VIVID" allows for setting the automatically controlled target value to a value closest to the high chrominance side as well as the chrominance control to the narrowest range. Such a setting allows for providing vivid color control to image data.

(3) "SHARPER"

In the "SHARPER", the edge enhancement is automatically controlled. However, as shown in FIG. 7, the "SHARPER" allows for setting the automatically controlled target value to the strongest value as well as the edge enhancement to the narrowest range. Such a setting allows for providing much sharper image quality control to image data.

On the other hand, the tone scale correction is also automatically controlled.

However, as shown in FIG. 8, the "SHARPER" allows the automatically controlled target value to be set to a slightly harder contrast value than the normal value and extremely soft curves to be excluded from tone scale correction alternatives. Such a setting allows for providing slightly contrast enhanced tone-scale-rich image data to further amplify sharp image data.

In the color mode, mode 1 is selected which optimizes the skin color.

On the other hand, the chrominance setting is also automatically controlled.

However, as shown in FIG. 9, the "SHARPER" allows for setting the automatically controlled target value to a value slightly closer to the high chrominance side as well as the chrominance control to a relatively wider range. Such a setting allows for providing slightly vivid image data to further amplify sharp image data.

(4) "SOFTER"

The "SOFTER" allows the edge enhancement to be automatically controlled. However, as shown in FIG. 7, the "SOFTER" allows the automatically controlled target value to be set to a slightly weaker value than the normal value and the edge enhancement to a slightly narrower range as compared to the case of the "NORMAL". Such a setting allows for providing image quality control to give a soft impression to image data.

On the other hand, the tone scale correction is also automatically controlled. However, as shown in FIG. 8, the "SOFTER" allows the same setting as the "NORMAL".

In the color mode, mode 1 is also selected which optimizes the skin color.

On the other hand, the chrominance setting is also automatically controlled.

However, as shown in FIG. 9, the "SOFTER" allows for setting the automatically controlled target value to a value slightly closer to the low chrominance side as well as the chrominance control to a slightly narrower range as compared to the case of the "NORMAL".

Such a setting allows for providing highly color faithful image data to further amplify soft image data.

(5) "DIRECT PRINT"

This "DIRECT PRINT" image quality control provides a preferably finished image quality when the electronic camera 111 is directly connected to a printer for printing.

First, in the "DIRECT PRINT", the edge enhancement is automatically controlled. However, as shown in FIG. 7, the "DIRECT PRINT" allows the automatically controlled target value to be set to a normal value and a narrower range of edge enhancement to be set as compared to the case of the "NORMAL". Such a setting makes it possible to obtain a predetermined edge enhancement result irrespective of the texture of image data, thus providing an image quality suitable for direct printing.

On the other hand, the tone scale correction is automatically controlled. However, as shown in FIG. 8, the "DIRECT PRINT" allows the same setting as in the "NORMAL".

In the color mode, since most pictures are taken for family use in the case of the DIRECT PRINT, mode 1 is selected which optimizes the skin color.

On the other hand, the chrominance setting is also automatically controlled.

However, as shown in FIG. 9, the "DIRECT PRINT" allows the automatically controlled target value to be set to a normal value and a narrower range of chrominance control to be set as compared to the case of the "NORMAL". Such a setting makes it possible to obtain a predetermined chrominance enhancement result irrespective of the texture of image data, thus providing an image quality suitable for direct printing.

(6) "PORTRAIT"

In the "PORTRAIT", the edge enhancement is automatically controlled. However, as shown in FIG. 7, the "POR-TRAIT" allows the automatically controlled target value to be set to a weaker value than the normal value and a slightly narrower range of edge enhancement to be set as compared to the case of the "NORMAL". Such a setting allows for avoiding unnecessarily enhanced edges in a portrait, thereby providing a preferable image quality to portraits.

On the other hand, the tone scale correction is also automatically controlled. However, as shown in FIG. 8, the "POR-TRAIT" allows the automatically controlled target value to be set to a slightly softer contrast value than the normal value and extremely hard tone scale correction curves to be excluded from tone scale correction alternatives. As a result, a shadow in a portrait or the like is softened to provide tone-scale-rich finished image quality to portraits.

In the color mode, mode 1 is selected which optimizes the skin color for portraits.

On the other hand, the chrominance setting is also automatically controlled. However, as shown in FIG. 9, the "POR-TRAIT" allows the automatically controlled target value to be set to a value slightly closer to the low chrominance side and a slightly narrower range of chrominance control to be set as compared to the case of the "NORMAL". Such a setting provides image data which has an extended range of reproducibility of the skin color in portraits.

(7) "LANDSCAPE"

In the "LANDSCAPE", the edge enhancement is automatically controlled. However, as shown in FIG. 7, the "LANDSCAPE" allows the automatically controlled target value to be set to the strongest value and the edge enhancement to be set to the narrowest range. Such a setting allows the details of a landscape to more clearly appear and enhances the appearance of the landscape.

On the other hand, the tone scale correction is also automatically controlled. However, as shown in FIG. 8, the "LANDSCAPE" allows the automatically controlled target value to be set to the hardest contrast value and the tone scale correction alternatives to be limited to hard contrast curves. Such a setting provides a contrast-enhanced landscape.

In the color mode, mode 3 is selected which optimizes landscape.

On the other hand, the chrominance setting is also automatically controlled. However, as shown in FIG. 9, the "LANDSCAPE" allows for setting the automatically controlled target value to a value closest to the high chrominance side and the chrominance control to the narrowest range. Such a setting makes it possible to provide vivid control to the color of a landscape such as greenness or sky blue.

(8) "CUSTOMIZE"

In the "CUSTOMIZE", the user can make individual settings on all the image quality control entries (which may also include white balance related entries) shown in FIG. 5.

[Operation for Changing Finish Keyword]

When having received a change in finish keyword for image quality controlled image data, the electronic camera 11 makes an ex post facto change to the finished image quality.

Figure 10:
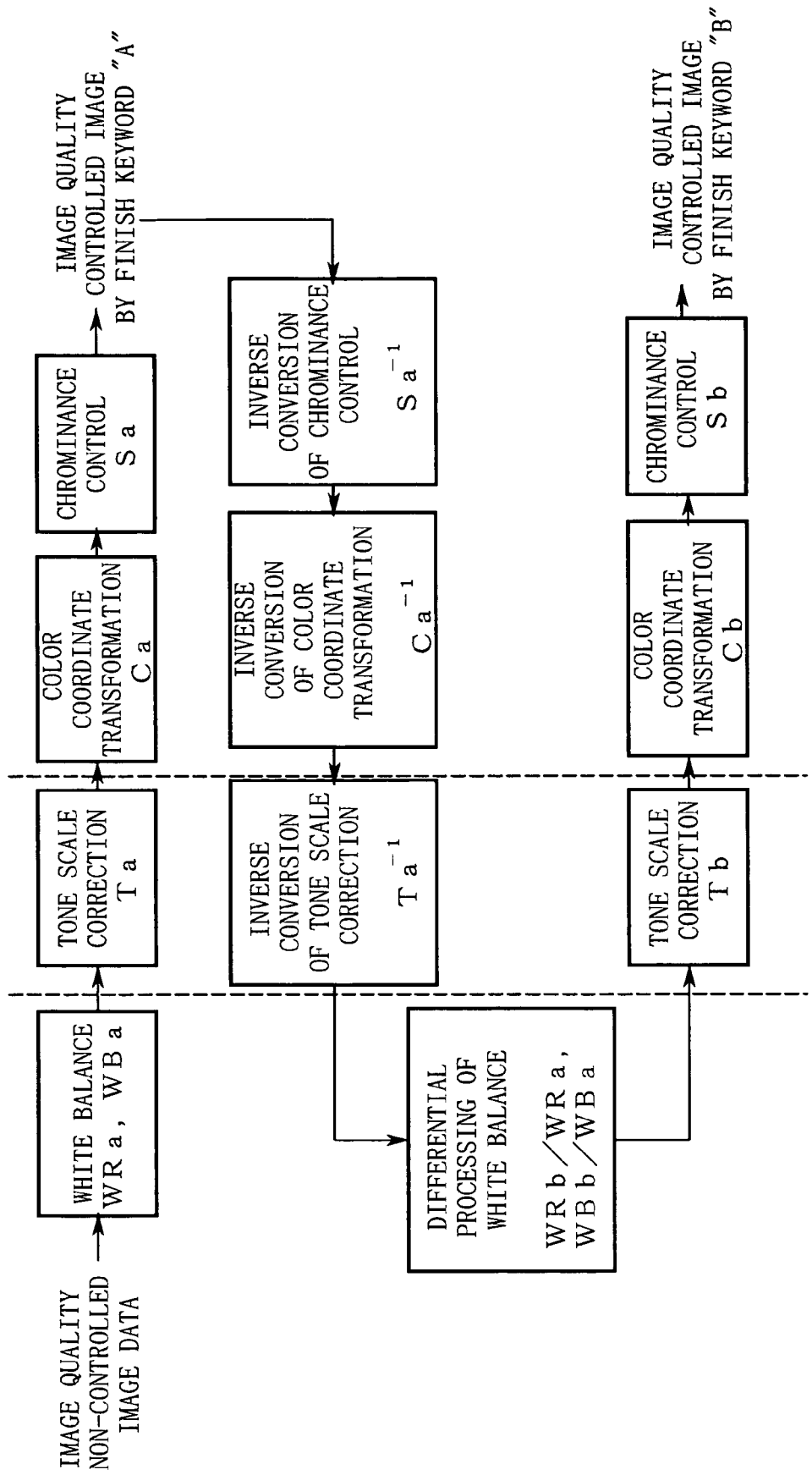
FIG. 10 is an explanatory view showing an operation for finish changing.

FIG. 10 is an explanatory view showing a change in finished image quality (a change from a finish keyword "A" to a finish keyword "B" in this example). To facilitate description, explanations will be given to the four types of image quality control entries (the white balance control, the tone scale correction, the color coordinate transformation or color mode, and the chrominance control).

While viewing a display on the monitor part 25, the user selects an image quality controlled image among the images stored on the memory card 21. Under this condition selected, the user depresses the menu button 30 to display the aforementioned menu window for setting finished image qualities. At this time, the control part 22 detects from additional information of the stored images that the finish keyword "A" has been already applied, and then moves the focus position displayed on the menu to the finish keyword "A".

The user moves the focus position displayed in the menu to selectively decide a new finish keyword "B" for the desired change in finished image quality.

Upon such a user operation, the control part 22 starts image quality control again on the image quality controlled image.

First, the control part 22 references the correlated information in the storage part 26 or the additional information of the image to acquire image quality control parameters (1) to (4) which have been applied to the finish keyword "A".

(1) Control gains WRa and WBa for R and B signals in white balance control;
(2) Nonlinear tone scale correction table Ta;
(3) Transformation matrix Ca for color coordinate transformation; and
(4) Control gain Sa for chrominance control.

Further, the control part 22 references the correlated information and the image quality control part 19 to acquire image quality control parameters (5) to (8) which are to be applied to the finish keyword "B".

(5) Control gains WRb and WBb for R and B signals in white balance control;
(6) Nonlinear tone scale correction table Tb;
(7) Transformation matrix Cb for color coordinate transformation; and
(8) Control gain Sb for chrominance control.

In accordance with these pieces of information, the control part 22 attempts to recover the image quality controlled image to the necessary and possible degree to provide the image quality non-controlled image.

First, the chrominance of an image quality controlled image is multiplied by a chrominance control inverse gain $Sa^{-1}$ to obtain a recovered non-controlled chrominance image.

Then, the recovered non-controlled chrominance image is multiplied by a color coordinate transformation inverse matrix $Ca^{-1}$ to obtain a recovered color coordinate non-transformed image.

Further, the recovered color coordinate non-transformed image is subjected to an inverse conversion using a tone scale correction inverse conversion table $Ta^{-1}$ to obtain a recovered tone scale non-corrected image.

Then, the recovered tone scale non-corrected image is multiplied by white balance differential gains WRb/WRa and WBb/WBa.

Such differential processing can be performed to immediately obtain a white balanced image for the finish keyword "B" by skipping the intermittent arithmetic operations.

Subsequently, a tone scale correction is made to the white balanced image using the tone scale correction table Tb to obtain a tone scale corrected image.

Furthermore, the tone scale corrected image is multiplied by the color coordinate transformation matrix Cb to obtain a color coordinate transformed image.

Then, the color coordinate transformed image is multiplied by the chrominance control gain Sb to obtain an image quality controlled image by the finish keyword "B".

[Function for Customizing Finished Image Quality Through the Selection of Images]

The computer 31 can make fine image quality control to RAW data in accordance with a user instruction. Further, the computer 31 can also additionally register the finished image quality resulting from the control with the finish settings for the electronic camera 11.

Figure 11:
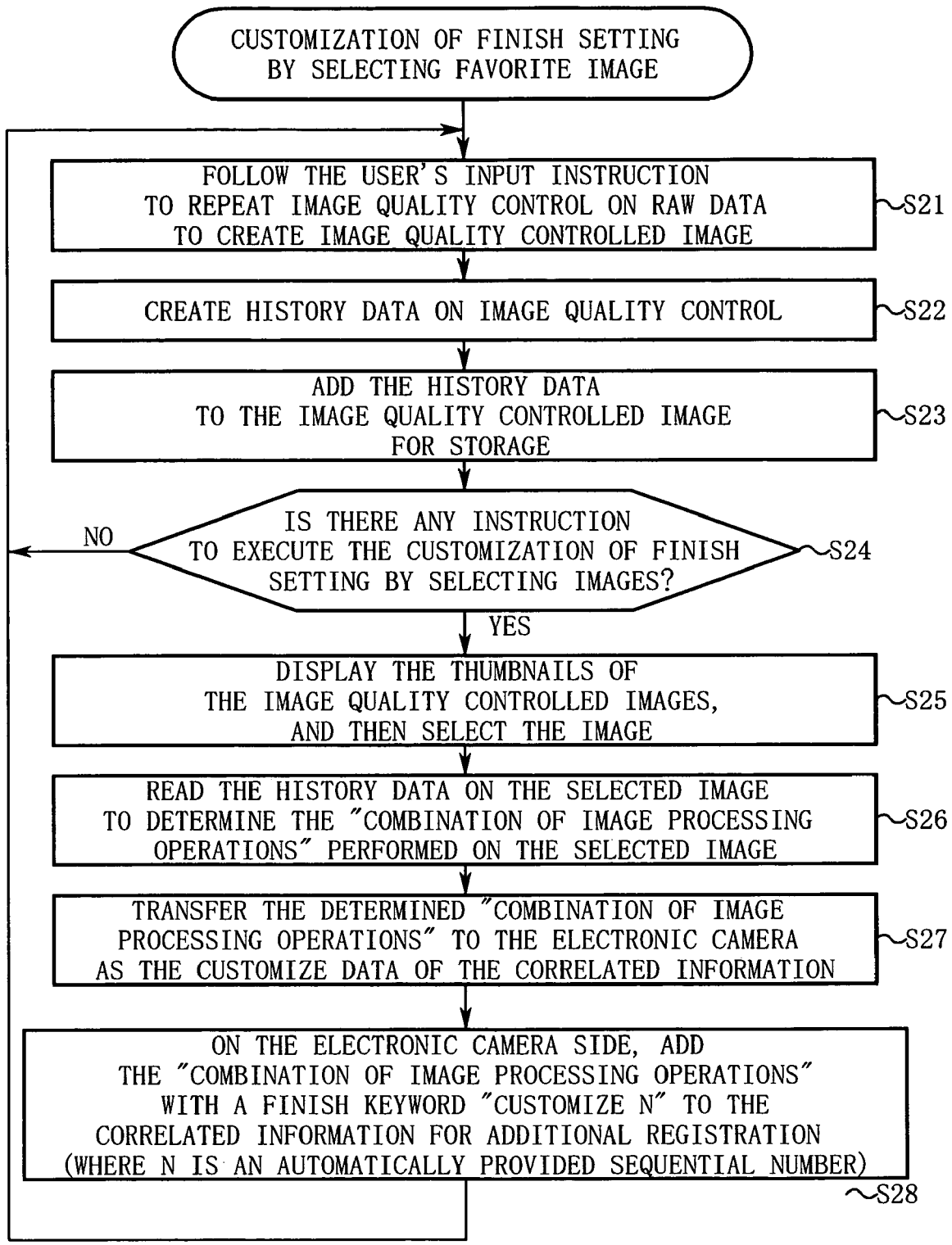
FIG. 11 is an explanatory flowchart showing an operation of customizing a finish setting by selecting images.

FIG. 11 is a view showing a processing program for implementing the aforementioned function. Now, an explanation will be given to the "function for customizing the finish setting by selecting images" in accordance with the step numbers of FIG. 11.

[Step S21] A user provides an input instruction for image quality control to the computer 31 via the keyboard or the mouse. In accordance with the input instruction, the computer 31 performs a series of image processing on RAW data to create a user's favorite image quality controlled image.

[Step S22] The computer 31 arranges the image processing operations, in the order in which they have been carried out, which have been performed on the image quality controlled image thus created, thereby creating history data on the image processing operations.

[Step S23] The computer 31 adds the history data to the image quality controlled image, and stores the resulting data in a storage medium.

[Step S24] If there is no instruction given by the user, then the computer 31 returns its control to Step S21 to repeat image quality control on new RAW data.

On the other hand, when having received a user customize instruction from the electronic camera 11, the computer 31 moves its control to Step S25.

[Step S25] The computer 31 reads a plurality of image quality controlled images from the storage medium to display thumbnails. The user selects a favorite image quality controlled image from among the thumbnails displayed.

[Step S26] The computer 31 reads the history data from the selected image to determine the "combination of image processing operations" performed on the selected image.

[Step S27] The computer 31 transfers information or the determined "combination of image processing operations" to the electronic camera 11 as the customize data from the electronic camera 11.

Suppose that the image quality control provided by the user does not have a flexible range of settings like automatic control but a fixed control value. In this case, it is preferable for the customize data to have a predetermined range of settings before or after the fixed control value. Such a range of settings makes it possible to control a variable range of image quality control for individual pieces of image data.

The user may input the upper and lower limits for defining this range of settings.

Further, suppose that the user has selected a plurality of user's favorite image quality controlled images. In this case, the computer 31 may also define the range of settings within the coverage of the control values for image quality control of the plurality of selected images.

[Step S28] the electronic camera 11 side, a finish keyword such as "customize N" is added to the "combination of image processing operations" transferred, for additional registration with the correlated information in the storage part 26 (where N is an automatically provided sequential number).

It is also possible for the user to operate the computer 31 to input a finish keyword. The finish keyword is transferred to the electronic camera 11. In this case, on the electronic camera 11 side, the input finish keyword is added to the "combination of image processing operations" transferred, for additional registration with the correlated information in the storage part 26.

[Effects of this Embodiment]

As described above, in this embodiment, the user selects a finish keyword, thereby allowing a "combination of image processing operations" required for the desired finished image quality to be selectively performed. As a result, the user needs not to operatively input complicated and difficult image quality parameters intentionally one by one. Thus, the electronic camera 11 is realized which has improved operability of image quality control.

Furthermore, in this embodiment, it is possible to select a finish keyword independent of the exposure control mode. As a result, it is also possible to combine the exposure control and the finished image quality to obtain user's more favorable image data.

Additionally, the exposure control mode and the finish keyword are independent of each other. This allows for implementing the electronic camera 11 which is easy to use for the user who is familiar with the exposure control through their experience with the film camera but unfamiliar with image quality control.

Furthermore, the exposure control mode is first selected, thereby allowing the user to take enough time to thoroughly consider their photographic intention for a subject. Subsequently, the user can keep the thoroughly considered photographic intention in mind to properly select a finish keyword suitable for the photographic intention from the menu window.

Such an operational procedure gives consideration to the process of user's reviewing of the photographic intention and is thus a rational and natural flow, thereby implementing the electronic camera 11 which is considerably user friendly.

Furthermore, in this embodiment, a finish keyword "CUSTOMIZE" or the computer 31 can be used, thereby allowing a user's own finished image quality to be readily registered. Therefore, it is possible to employ the user's own finished image quality as the registered standard finished image quality, which can be readily applied at any time.

Furthermore, in this embodiment, it is also possible to make an ex post facto change to the finished image quality of an image quality controlled image. In this case, the differential processing on the image quality control can be performed, thereby reducing processing costs or restricting errors from occurring in operational processing.

[Supplements to this Embodiment]

In the aforementioned embodiment, the customize data is created for the correlated information on the external computer 31 side. However, the present invention is not limited thereto. For example, a try and error environment for image quality control can be provided in the electronic camera 11, thereby performing the customize operation shown in FIG. 11 within the electronic camera 11.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An electronic camera performing multiple types of image quality control operations on image data, the electronic camera comprising:
   an image pickup part capturing a subject image to generate image data;
   a storage part storing correlated information between a plurality of finish keywords indicative of finished image qualities and combinations of set values of the respective image quality control operations;
   an input part selecting any of the finish keywords in response to a user input;
   a control part determining the combination of set values of the respective image quality control operations corresponding to the finish keyword selected at the input part by referencing the correlated information stored in the storage part;
   an image quality control part performing the multiple types of the image quality control operations to image data generated by the image pickup part in accordance with the combination of set values of the respective image quality control operations determined by the control part;
   a manual control part performing each of the image quality control operations on the image data according to a set value of an image quality control set by a user;
   an information adding part adding information to image data to which the image quality control operations are performed by the manual control part, the information indicates the combination of set values of the respective image quality control operations used at the manual control part at the time of performing the image quality control operations; and
   a favorite image selection part selecting the image data finished at the manual control part, by a user input, wherein:
   the storage part customizes the correlated information by registering an information indicating the combination of set values of the respective image quality control operations appended to the image data selected at the favorite image selection part in accordance with the finish keyword.

2. An electronic camera performing multiple types of image quality control operations on image data, the electronic camera comprising:
   an image pickup part capturing a subject image to generate image data;
   a storage part storing correlated information between a plurality of finish keywords indicative of finished image qualities and combinations of set values of the respective image quality control operations;
   an input part selecting any of the finish keywords in response to a user input;
   a control part determining the combination of set values of the respective image quality control operations corresponding to the finish keyword selected at the input part by referencing the correlated information stored in the storage part; and
   an image quality control part performing the multiple types of image processing to the image data in accordance with the combination of set values of the respective image quality control operations determined by the control part; wherein:
   the input part has a function for receiving a change in finish keyword for image quality controlled image data;
   the combination of set values of the respective image quality control operations can be largely divided into a set value of nonlinear tone scale correction processing, a set value of pre-processing to be performed before the tone scale correction processing, and a set value of post-processing to be performed after the tone scale correction processing;
   the image quality control part performs the following processing operations (1) to (5) on the image quality controlled image data for which a change in finish keyword has been accepted, to change the finished image qualities:
   (1) the image quality control part performs an inverse conversion on the result from the post-processing that has been performed;
   (2) the image quality control part then performs an inverse conversion on the result from the tone scale correction processing that has been performed;
   (3) the image quality control part then performs processing on the difference between the performed pre-processing and the pre-processing corresponding to the changed finish keyword;
   (4) the image quality control part then performs the tone scale correction processing corresponding to the changed finish keyword; and
   (5) the image quality control part then performs the post-processing corresponding to the changed finish keyword.

3. A memory medium storing a processing program that communicates the electronic camera according to claim 1 performing multiple types of image quality control operations on image data with a computer, wherein:
   the storage part customizes the correlated information by registering information indicating the combination of set values of the respective image quality control operations received from the computer in accordance with the finish keywords, and
   the program causes the computer to function as:
   a manual control part performing each of the image quality control operations on the image data according to a set value of an image quality control set by a user;
   an information adding part adding information to image data on which image quality control operations are performed by the manual control part, the information indicates the combination of set values of the respective image quality control operations used at the manual control part at the time of performing the image quality control;
   a favorite image selection part selecting the image data finished at the manual control part, by a user input; and
   an information transmission part transmitting information on the combination of set values of the respective image quality control operations applied to the image data selected at the favorite image selection part to the electronic camera as the customized data on the correlated information.

4. A memory medium storing a processing program that communicates the electronic camera according to claim 2 performing multiple types of image quality control operations on image data with a computer, wherein:
   the storage part customizes the correlated information by registering information indicating the combination of set values of the respective image quality control operations received from the computer in accordance with the finish keywords, and
   the program causes the computer to function as:
   a manual control part performing each of the image quality control operations on the image data according to a set value of an image quality control set by a user;

an information adding part adding information to image data on which image quality control operations are performed by the manual control part, the information indicates the combination of set values of the respective image quality control operations used at the manual control part at the time of performing the image quality control;

a favorite image selection part selecting the image data finished at the manual control part, by a user input; and an information transmission part transmitting information on the combination of set values of the respective image quality control operations applied to the image data selected at the favorite image selection part to the electronic camera as the customized data on correlated information.

* * * * *